US009338702B2

(12) United States Patent
Kweon et al.

(10) Patent No.: US 9,338,702 B2
(45) Date of Patent: May 10, 2016

(54) METHOD AND APPARATUS FOR ASSIGNING IP ADDRESS IN MOBILE COMMUNICATION NETWORK

(71) Applicant: Samsung Electronics Co., Ltd., Gyeonggi-do (KR)

(72) Inventors: Ki-Suk Kweon, Gyeonggi-do (KR); Jung-Shin Park, Seoul (KR); Yeong-Moon Son, Gyeonggi-do (KR); Antony Franklin, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 70 days.

(21) Appl. No.: 14/268,897

(22) Filed: May 2, 2014

(65) Prior Publication Data
US 2014/0328319 A1   Nov. 6, 2014

(30) Foreign Application Priority Data

May 3, 2013   (KR) ........................ 10-2013-0049825

(51) Int. Cl.
| | | |
|---|---|---|
| *H04W 4/00* | (2009.01) | |
| *H04W 36/00* | (2009.01) | |
| *H04L 29/12* | (2006.01) | |
| *H04W 8/26* | (2009.01) | |

(52) U.S. Cl.
CPC ....... *H04W 36/0055* (2013.01); *H04L 61/2007* (2013.01); *H04W 8/26* (2013.01); *H04W 36/0011* (2013.01)

(58) Field of Classification Search
CPC . H04W 36/0055; H04W 8/26; H04L 61/2007
See application file for complete search history.

(56) References Cited

U.S. PATENT DOCUMENTS

| | | | | |
|---|---|---|---|---|
| 6,845,094 | B1* | 1/2005 | Zhang | ............... H04L 29/12283 370/349 |
| 8,130,646 | B2 | 3/2012 | Lee et al. | |
| 8,223,716 | B2 | 7/2012 | Ohba et al. | |
| 2002/0118656 | A1* | 8/2002 | Agrawal | ................. H04L 12/24 370/329 |
| 2002/0141360 | A1* | 10/2002 | Baba | ................. H04W 36/0011 370/331 |
| 2003/0067923 | A1* | 4/2003 | Ju | ..................... H04L 29/12066 370/395.3 |

(Continued)

FOREIGN PATENT DOCUMENTS

KR   10-2010-0118730 A   11/2010

OTHER PUBLICATIONS

International Search Report dated Aug. 27, 2014 in connection with International Application No. PCT/KR2014/003769; 3 pages.

(Continued)

*Primary Examiner* — Kevin Mew

(57) ABSTRACT

When a Mobile Node (MN) is assigned IP addresses, the number of which is greater than or equal to the preset number of IP addresses that the MN is capable of being assigned with, the MN identifies information on the pre-emption vulnerability of each session associated with an IP address, and releases an IP address which enables a disconnection of a session. When there are multiple IP addresses associated with the pre-emptable sessions, a consideration is given to multiple conditions related to which IP address is to be selected, one IP address is selected, and the relevant IP address is released. When any IP address cannot be released, a new session is associated with an IP address which can give the smallest overhead to the MN and the network among the existing IP addresses, so that an IP address can be efficiently assigned.

17 Claims, 9 Drawing Sheets

(56) References Cited

U.S. PATENT DOCUMENTS

| | | | | |
|---|---|---|---|---|
| 2003/0165121 A1* | 9/2003 | Leung | ............... | H04L 29/12009 370/313 |
| 2005/0013280 A1* | 1/2005 | Buddhikot | ........ | H04L 29/12358 370/349 |
| 2005/0233737 A1* | 10/2005 | Lin | ....................... | H04L 12/581 455/416 |
| 2005/0282562 A1* | 12/2005 | Lee | .................. | H04W 36/0055 455/458 |
| 2006/0083238 A1 | 4/2006 | Lee et al. | | |
| 2006/0206597 A1* | 9/2006 | Kim | .................. | H04L 29/12311 709/220 |
| 2008/0130647 A1 | 6/2008 | Ohba et al. | | |
| 2008/0205326 A1* | 8/2008 | Caradec | ................ | H04W 40/02 370/328 |
| 2009/0147752 A1* | 6/2009 | Chung | .............. | H04L 29/12311 370/331 |
| 2009/0161629 A1* | 6/2009 | Purkayastha | ..... | H04W 36/0011 370/331 |
| 2014/0376454 A1* | 12/2014 | Boudreau | ............. | H04W 24/02 370/329 |

OTHER PUBLICATIONS

Written Opinion of international Searching Authority dated Aug. 27, 2014 in connection with International Application No. PCT/KR2014/003769; 4 pages.

3GPP TS 23.203; V12,0.0 (Mar. 2013); "Policy and Charging Control Architecture"; Release 12; 184 pages.

* cited by examiner

METHOD AND APPARATUS FOR ASSIGNING IP ADDRESS IN MOBILE COMMUNICATION NETWORK

CROSS-REFERENCE TO RELATED APPLICATION(S) AND CLAIM OF PRIORITY

The present application is related to and claims priority under 35 U.S.C. §119(a) to Korean Patent Application Serial No. 10-2013-0049825, which was filed in the Korean Intellectual Property Office on May 3, 2013, the entire disclosure of which is incorporated herein by reference.

TECHNICAL FIELD

The present disclosure relates generally to a method and an apparatus for assigning an Internet Protocol (IP) address in a mobile communication network. More particularly, the present disclosure relates to a method and an apparatus for efficiently assigning an IP address in a dynamic distributed mobility management environment of a mobile communication network.

BACKGROUND

Because a terminal can move in a mobile communication network, a network needs to always detect the location of the terminal, and needs to seamlessly and efficiently deliver data transmitted through another network to the terminal.

To this end, the mobile communication network supports handover and roaming. Handover smoothly maintains a telephone call of the terminal moving between a cell of a base station and that of another base station, and roaming smoothly maintains a telephone call of the terminal moving between an optional provider network and another provider network. In this regard, mobility management refers to the continuous management of a location, at which the terminal is positioned in the mobile communication network, in order to provide the terminal with a seamless mobile communication service as described above.

A serious problem is that an IP address is a very limited resource. Specifically, in a situation where it is difficult to currently assign even one IP address to the Mobile Node (MN), it is actually impossible to assign an IP address to the MN without restriction.

SUMMARY

To address the above-discussed deficiencies, it is a primary object to provide a method and an apparatus for efficiently assigning a limited number of IP addresses to an MN in a dynamic distributed mobility management environment of a mobile communication network.

In accordance with an aspect of the present disclosure, a method for assigning an Internet Protocol (IP) address to a Mobile Node (MN) in a mobile communication network is provided. The method includes comparing, by the MN, the total number of IP addresses that the MN has been assigned with up to now, which includes an IP address that the MN is assigned with by a Target-Mobility Agent (T-MA), with the preset number of IP addresses that the MN is capable of being assigned with, when the MN is handed over from a Source-Mobility Agent (S-MA) to the T-MA, and associating, by the MN, a session with any one of IP addresses assigned by previous MAs or with the IP address assigned by the T-MA, based on a result of the comparison.

In accordance with another aspect of the present disclosure, a method for assigning an Internet Protocol (IP) address to a Mobile Node (MN) by a Mobility Agent (MA) including a Source-Mobility Agent (S-MA) and a Target-Mobility Agent (T-MA) in a mobile communication network is provided. The method includes determining, by the S-MA, whether the S-MA receives an IP resolution request from the MN when the MN is handed over from the S-MA to the T-MA; identifying, by the S-MA, IP addresses associated with pre-emptable sessions among IP addresses that the MN has been assigned with by previous Mobility Agents (MAs), by scanning UE context of the MN, when it is determined that the S-MA receives the IP resolution request, and releasing the identified IP addresses and associating a session with a new IP address by assigning the new IP address to the MN, when it is identified that there exists the IP address associated with the pre-emptable sessions, and associating the session with an IP address assigned by any one of the previous MAs when it is identified that there exists no IP address associated with the pre-emptable sessions.

In accordance with still another aspect of the present disclosure, a Mobile Node (MN) that is assigned with an Internet Protocol (IP) address in a mobile communication network is provided. The MN includes a controller that compares the total number of IP addresses that the MN has been assigned with up to now, which includes an IP address that the MN is assigned by a Target-Mobility Agent (T-MA), with the preset number of IP addresses that the MN is capable of being assigned with, when the MN is handed over from a Source-Mobility Agent (S-MA) to the T-MA, and a communication unit (e.g., a transceiver) that transmits an IP resolution request to the S-MA based on a result of the comparison, wherein the controller associates a session with the IP address assigned by the T-MA or with an IP address assigned by any one of previous MAs, at a request from the S-MA that receives the IP resolution request.

In accordance with yet another aspect of the present disclosure, a Mobility Agent (MA) that assigns an Internet Protocol (IP) address to a Mobile Node (MN) in a mobile communication network is provided. The MA includes previous Source-Mobility Agents (S-MAs), each of which establishes a session with the MN, and a Target-Mobility Agent (T-MA) that maintains continuity of the sessions when the MN is handed over, wherein the S-MA includes a communication unit that receives an IP resolution request from the MN, and a controller that identifies IP addresses associated with pre-emptable sessions among IP addresses assigned by the previous S-MAs by scanning UE context of the MN at the IP resolution request, associates a session with a new IP address assigned by the T-MA when it is identified that there exists the IP address associated with the pre-emptable sessions, and associates the session with an IP address that the MN has been assigned with by any one of the previous MAs when it is identified that there exists no IP address associated with the pre-emptable sessions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, an embodiment of the present disclosure will be described in detail with reference to the accompanying drawings.

Before the description, the number of IP addresses to be assigned to an MN may be limited by three methods described below. A first method is to assign a fixed number of IP addresses to each of all MNs. A second method is to adjust the number of IP addresses to be dynamically assigned, in view of the number of MNs in a network. In other words, when a small number of MNs are currently connected to the network, a large number of IP addresses are assigned to one MN. When a large number of MNs are currently connected to the network, the number of IP addresses capable of being assigned with is reduced so as to meet this situation. Also, a third method is to adjust the number of IP addresses capable of being assigned with, based on a user profile. Specifically, a larger number of IP addresses are assigned to a user who uses a high-priced service, but a smaller number of IP addresses are assigned to another user who does not use the high-priced service. In the following embodiment of the present disclosure, for conciseness and ease of description, a case will be described in which a fixed number of IP addresses are assigned to each of all MNs.

A mobility management technique in an existing mobile communication network adopts a centralized scheme based on a hierarchical network structure.

Figure 1:
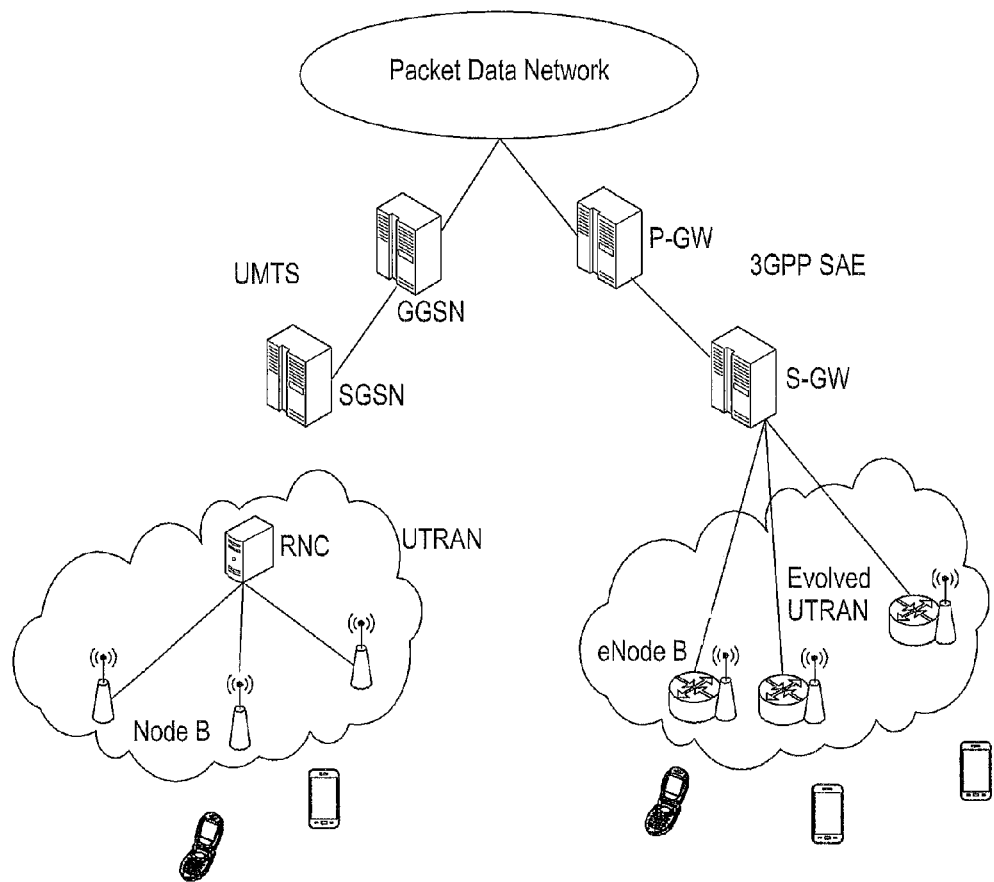
FIG. 1 is a view illustrating a network structure for explaining a mobility management technique in a mobile communication network.

FIG. 1 is a view illustrating a network structure for explaining a mobility management technique in a mobile communication network.

FIG. 1 illustrates a network structure of Universal Mobile Telecommunication System™ (UMTS™) and that of System Architecture Evolution (SAE), which are defined by the 3rd Generation Partnership Project™ (3GPP™) standard.

As described above, the mobility management technique in the mobile communication network adopts the centralized scheme which is based on the hierarchical network structure. In the case of the centralized mobility management technique, a mobility agent that manages the mobility of the terminal is located in a central core network. Specifically, a Packet Data Network (PDN) Gateway (P-GW) corresponds to a centralized mobility agent in 3GPP™ SAE, and a Gateway General Packet Radio Standard™ (GPRS™) Support Node (GGSN) corresponds to a centralized mobility agent in a UMTS™ network.

The above-described centralized mobility management technique has a feature such that the centrally-located mobility agent manages binding information of a mobile terminal and processes data traffic.

The mobility management according to the centralized scheme causes problems, such as the inefficiency of using a non-optimal routing route, a single point of failure of the centralized mobility agent, and the centralization of traffic in the core network.

In order to solve the problems of the mobility management according to the centralized scheme, a dynamic distributed mobility management technique has been proposed.

The dynamic distributed mobility management technique fits in well with a trend in which a structure of the mobile communication network evolves from a hierarchical structure to a flat structure.

The above-described dynamic distributed mobility management technique has a concept such that the function of a mobility agent is not placed in a core network but is dispersed into a wireless access network.

Figure 2:
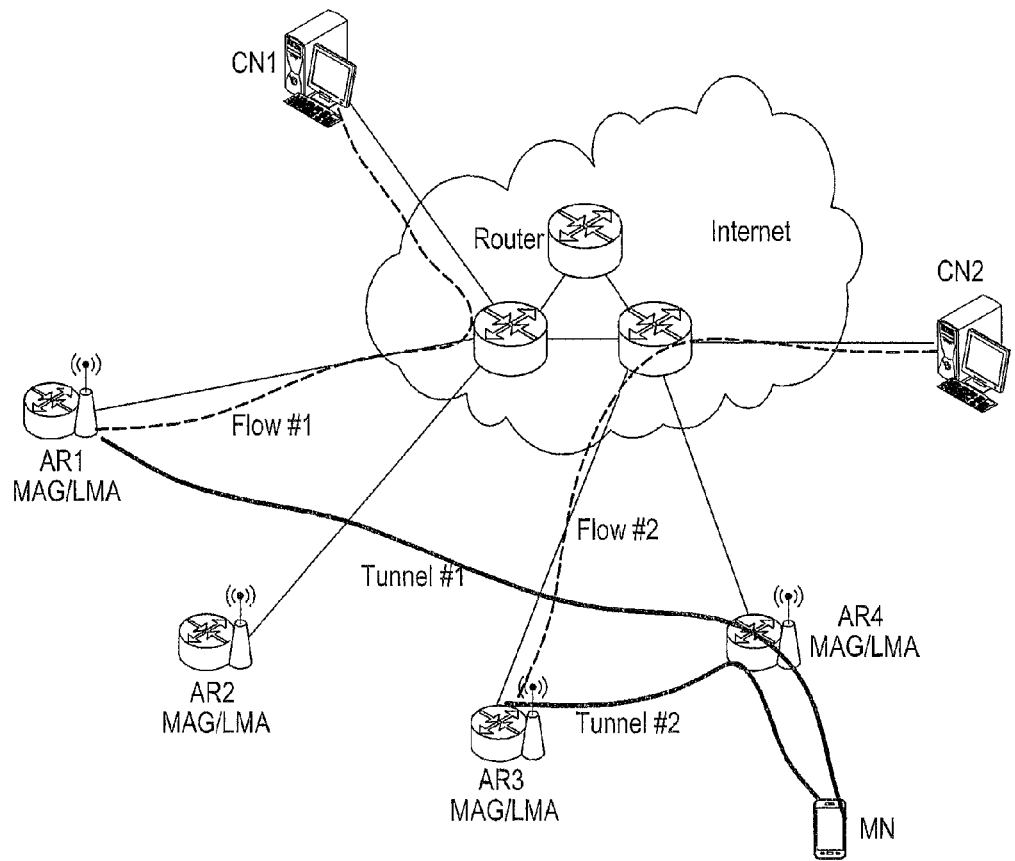
FIG. 2 is a view for explaining a Proxy Mobile IP (PMIP)-based dynamic distributed mobility management technique proposed by the Internet Engineering Task Force (IETF)

FIG. 2 is a view for explaining a Proxy Mobile IP (PMIP)-based dynamic distributed mobility management technique proposed by the Internet Engineering Task Force (IETF).

Referring to FIG. 2, in the case of the dynamic distributed mobility management technique, Local Mobility Anchors/Mobile Access Gateways (LMAs/MAGs), each of which performs a mobility management function in the centralized scheme, are disposed in such a manner as to be distributed to multiple Access Routers (ARs) AR1, AR2, AR3 and AR4, respectively. Then, whenever a Mobile Node (MN) changes a Point of Attachment (PoA), the MN is assigned a new IP address by an LMA and a new session is generated by using the IP address assigned at the relevant PoA.

As illustrated in FIG. 2, when the MN is in a state of being connected to Access Router 1 (AR1), the MN forms a session represented by Flow #1 with Corresponding Node 1 (CN1) by using an address assigned by the Local Mobility Anchor (LMA) of AR1.

When the MN is in a state of being connected to AR3, the MN forms a session represented by Flow #2 with CN2 by using an address assigned by the LMA of AR3.

The LMA of each of AR1 and AR3 takes charge of the responsibility of transmitting a packet, which is transmitted during each of the sessions represented by Flow #1 and Flow #2, to the MN.

When the MN changes a PoA, the LMA that anchors each session needs to know a new PoA of the MN for the sake of IP session continuity. Here, the IP session continuity refers to an attribute which enables the MN to seamlessly receive data transmitted during the existing session even when the MN changes a PoA.

In FIG. 2, in order to transmit data transmitted during the session Flow #1 and data transmitted during the session Flow #2 to the MN, each of the LMAs that anchor the respective sessions builds a tunnel to a Mobile Access Gateway (MAG) existing at a current PoA of the MN, and forwards data to the MN.

To this end, each LMA needs to know the current PoA of the MN. The current PoA of the MN is known through Binding Update (BU) between an anchoring LMA and a new PoA. Specifically, when the MN changes a PoA due to the movement thereof, a relevant MAG needs to transmit newly-assigned IP address information to the LAM that anchors a session of the MN.

As described above, in the case of the dynamic distributed MN mobility management, the MN is assigned a new Home Address (HoA) by the mobility agent whenever the MN changes a PoA. Also, the MN does not release the relevant HoA as long as a session is not terminated even when the MN moves to another PoA. In this regard, when the MN is assigned HoAs at respective PoAs and establishes a session by using a relevant HoA while the MN moves, the MN needs to possess and maintain multiple HoAs.

That the MN manages multiple HoAs acts as significant overhead on not only the MN but also the network. The MN needs to periodically transmit binding update to the relevant mobility agent and the mobility agent needs to process the binding update, for the sake of IP session continuity.

Figure 3:
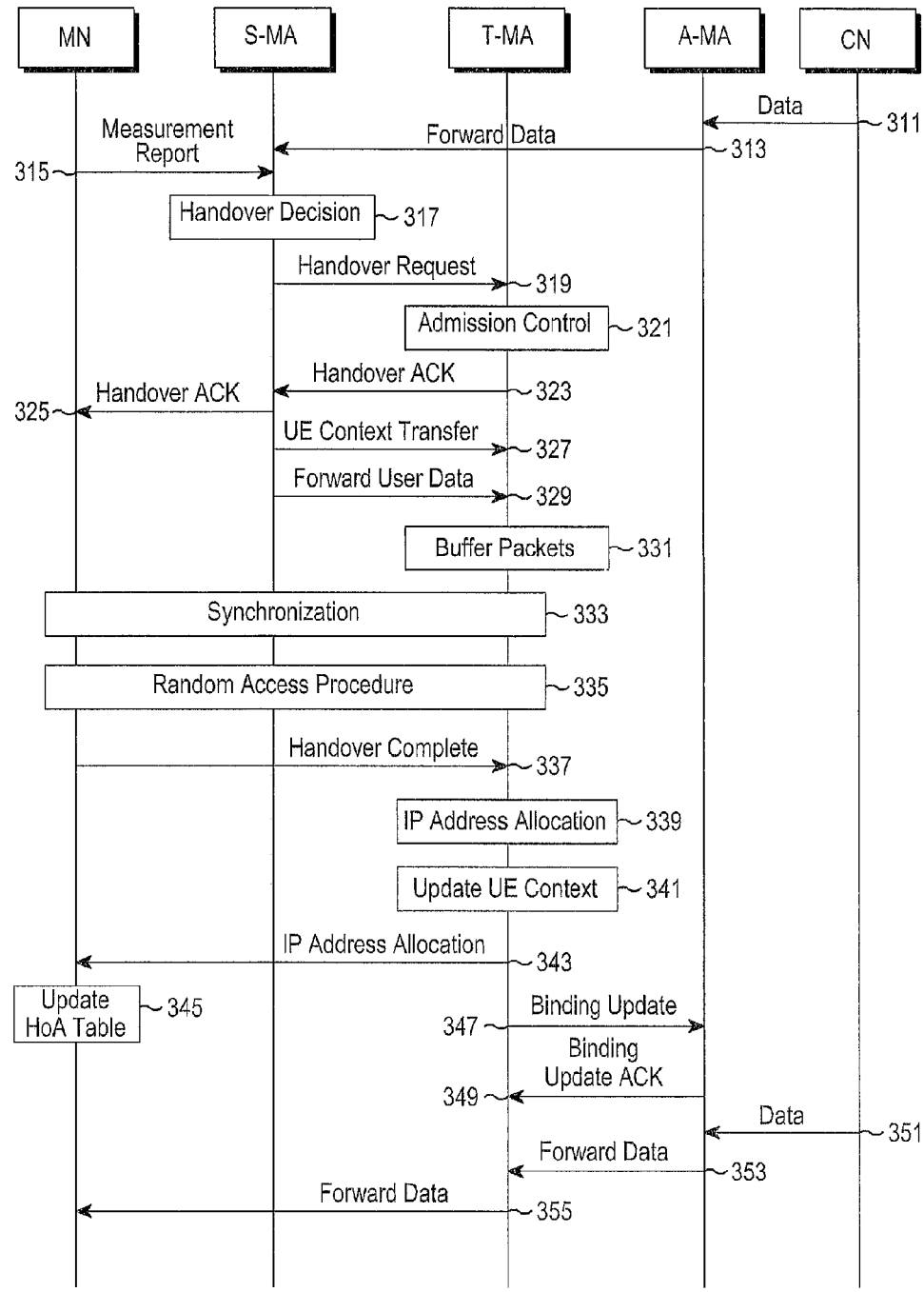
FIG. 3 is a signal flow diagram between an MN and mobility agents during handover of the MN according to an embodiment of the present disclosure.

FIG. 3 is a signal flow diagram between an MN and agents during handover of the MN according to an embodiment of the present disclosure.

Referring to FIG. 3, in step 311, a Correspondent Node (CN) transmits data to an Anchoring-Mobility Agent (A-MA) that anchors a session.

In step 313, when receiving the data, the A-MA forwards the data to a Source-Mobility Agent (S-MA) that currently provides a service to an MN, and the forwarded data is transmitted to the MN by the S-MA.

In step 315, the S-MA receives a Measurement Report (MR) message from the MN. In step 317, the S-MA analyzes the received MR message, and thereby determines whether handover is to be performed. When it is determined as a result of analyzing the MR message that a link state between the MN and the S-MA is poor, the S-MA determines performing the handover.

In step 319, according to the determination of performing the handover, the S-MA transmits a handover request message, which requests handover, to a Target-Mobilty Agent (T-MA).

When the T-MA admits the handover according to the handover request message in step 321, in step 323, the T-MA transmits a handover ACKnowledgment (ACK) to the S-MA in response to the handover request message. In step 325, the S-MA forwards the handover ACK to the MN.

In step 327, the S-MA transmits UE context (i.e., information of the MN) to the T-MA. In step 329, the S-MA transmits data to be transmitted to the MN, to the T-MA.

In step 331, the T-MA stores packets in a buffer.

In step 333, the MN performs a synchronization procedure together with the T-MA. In step 335, the MN performs a random access procedure together with the T-MA.

When the synchronization procedure and the random access procedure are terminated in step 337, for the MN which is newly handed over, the T-MA assigns a HoA or an IP Address to the MN in step 339, and updates the UE context in step 341.

The T-MA transmits the assigned IP address to the MN in step 343, and transmits binding update information of the MN to the A-MA in step 347, thereby updating the A-MA. In step 349, when the update is completed, the A-MA transmits a binding update ACK, which notifies of the completion of updating the binding information, to the T-MA.

Thereafter, when the A-MA receives user data from the CN in step 351, in step 353, the A-MA forwards the user data to the T-MA. In step 355, the T-MA transmits the forwarded user data to the MN.

Meanwhile, in relation to a handover process in which the MN moves from the S-MA to the T-MA in terms of a communication service, the UE context that the S-MA transmits to the T-MA can include the multiple pieces of information listed as follow:

Home Address Attribute

A. $N_{IP\_limitation}$: the number of IP limitation (i.e., the number of IP addresses that the MN is capable of assigning)
B. $N_{IP\_assigned}$: the number of assigned IP (i.e., the number of IP addresses that the MN has been assigned up to now)
C. HoA: IP address [ID]: Structure of each assigned IP address
   c-1. $Time_{IP\_assigned}$: Assigned time (i.e., a time point of assigning a relevant IP address)
   c-2. BS_ID: IDentification (ID) of a Base Station (BS) (i.e., an ID of a BS that assigns the relevant IP address)
   c-3. $N_{session}$: the number of associated sessions (i.e., the number of sessions established by using the relevant IP address)
   c-4. Session attribute: Structure of each session formed by using the relevant IP address
     c-4-a. IP address of CN [ID] (i.e., an IP address of a destination node of a relevant session)
     c-4-b. Allocation and Retention Priority (ARP) attributes
     Pre-emption vulnerability (i.e., indicating that the relevant session enables pre-emption)
     Priority (i.e., indicating ARP priority of the relevant session)
     c-4-c. Quality of Service (QoS) (i.e., QoS Class Indication (QCI) of the relevant session)
     c-4-d. $Activity_{session}$: How frequently packet tx/rx (packet transmission activity of the relevant session (e.g., bytes/s, a unit of the amount of data transmitted per second))

Each MN maintains and updates, in step 345, a HoA table in order to manage an IP address that each MN is assigned with. The contents of the HoA table are identical to those of the home address attribute included in the UE context.

Figure 4A:
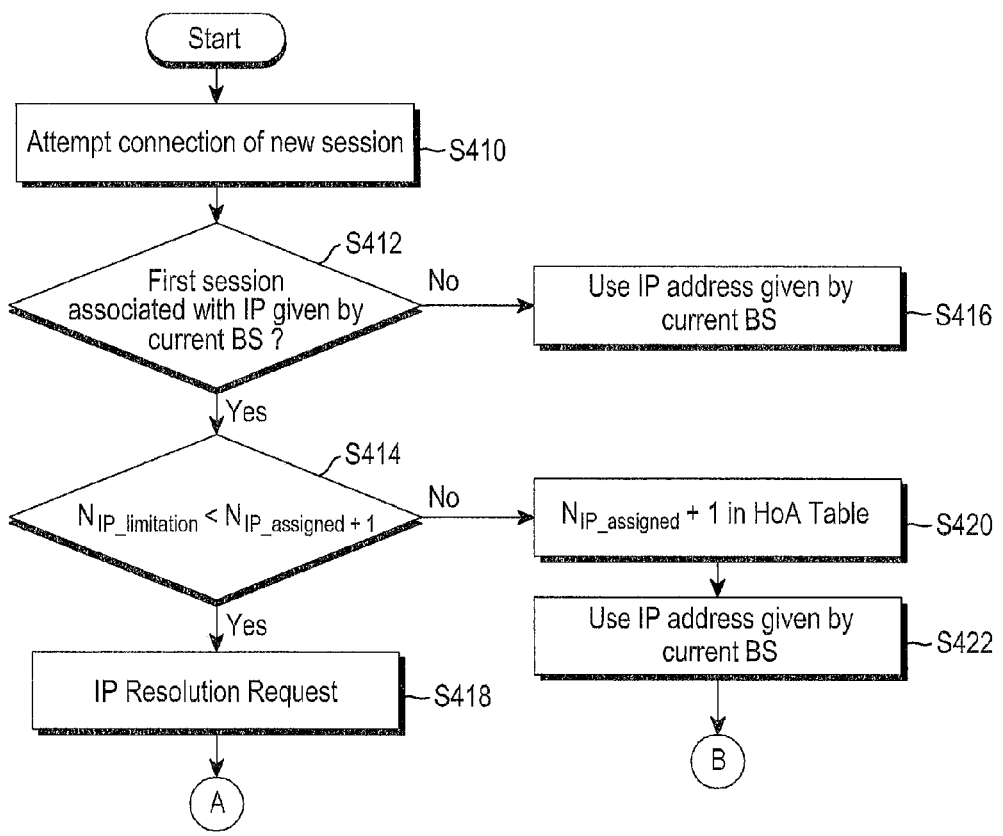
FIG. 4A and FIG. 4B are flowcharts illustrating a method for assigning an IP address to an MN according to an embodiment of the present disclosure.
Figure 4B:
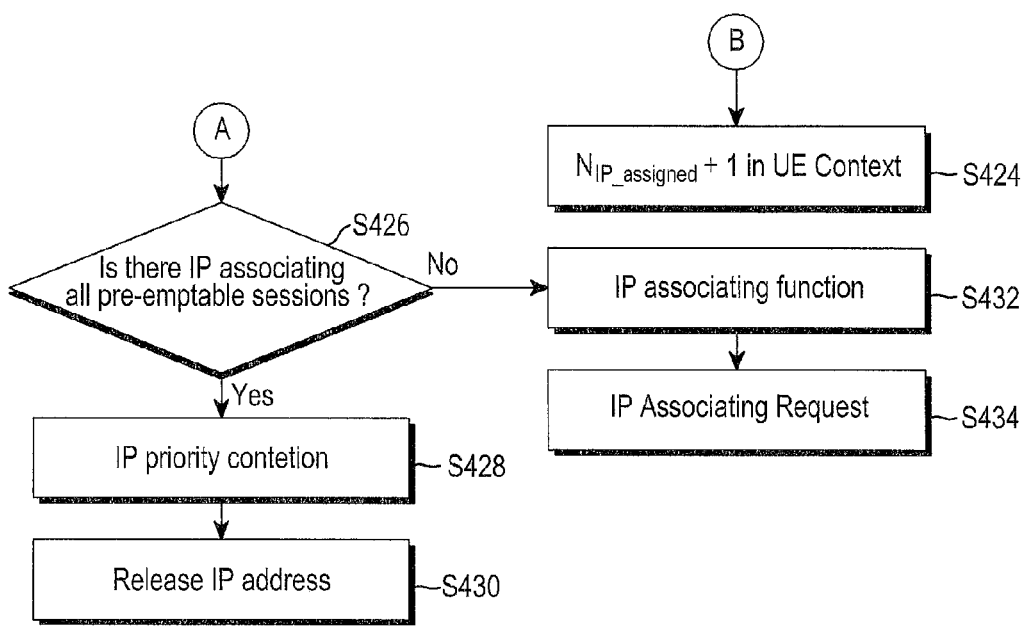

FIG. 4A and FIG. 4B are flowcharts illustrating a method for assigning an IP address to an MN according to an embodiment of the present disclosure. FIG. 4A illustrates steps performed by the MN, and FIG. 4B illustrates steps performed by the BS.

First, when the MN attempts to connect a new session with the CN in step S410, the MN determines in step S412 whether the connection of the session intended to be attempted is that of a first session associated with an IP address assigned by the current BS. The MN can store session information related to each session connected up to now, in an internal storage medium thereof. For example, a session ID which enables the identification of a session, a session name, whether the current session is to be activated, a session type, and the like. The MN can inquire about a storage medium which stores the multiple pieces of session information, and thereby can determine whether a connection of a session intended to be currently attempted is that of a first session.

When it is determined in step S412 that the connection of the session intended to be currently attempted is not that of the first session associated with the IP address assigned by the current BS, the MN uses IP address given by the current BS in step S416. When it is determined in step S412 that the connection of the session intended to be currently attempted is that of the first session associated with the IP address assigned by the current BS, in step S414, the MN compares the number of IP addresses that the MN is capable of being assigned with, which is represented by NIP_limitation, with the number of IP addresses, which is obtained by adding one IP address related to the first session to the number of IP addresses that the MN has been assigned with up to now, which is represented by NIP_assigned.

In step S418, when $N_{IP\_limitation} < N_{IP\_assigned}+1$, namely, when the number of IP addresses (represented by $N_{IP\_assigned}+1$), which is obtained by adding one IP address related to the first session to the number of IP addresses that the MN has been assigned with up to now, exceeds the limited (or preset) number of IP addresses (represented by $N_{IP\_limitation}$), the MN transmits an IP resolution request message to the BS, and inquires of the BS about which IP address is to be used to form the first session.

When receiving the IP resolution request message, the BS identifies all IP addresses assigned to the relevant MN by using UE context of the relevant MN.

Specifically, in step 426, the BS first determines whether there is an IP address capable of being pre-empted (i.e., pre-emptable) by all associated sessions. Here, pre-emption vulnerability is a term defined by policy and charge control architecture that 3GPP TS23.203 has defined. According to the definition by 3GPP TS23.203, ARP of a QoS parameter includes information on a priority level, pre-emption capability and pre-emption vulnerability.

In step S428 and step S430, according to an IP priority contention function according to an embodiment of the present disclosure, an IP address of a pre-emptable session is released. Because the pre-emptable session is allowed to be disconnected, when there is an IP address pre-emptable by all the associated sessions, the IP address is released, and a new session is established by using a newly-assigned IP address. It goes without saying that all the sessions associated with the released IP address are disconnected. When the number of IP addresses associated with the pre-emptable sessions is plural, a determination needs to be made as to which IP address is to be released. To this end, in an embodiment of the present disclosure, an IP priority contention function is defined. The IP priority contention function will be described in detail below.

When there is no IP address pre-emptable by all the associated sessions in step S426, no session can be disconnected (or released). Accordingly, a new session needs to be associated with an existing IP address. At this time, the BS needs to select an IP address, with which the new session is to be associated, from among the existing assigned IP addresses. To this end, in step S432, in an embodiment of the present disclosure, the BS selects an IP address, with which a session is to be associated, according to a defined IP associating function. The IP associating function will be described in detail below.

Meanwhile, when $N_{IP\_limitation} \geq N_{IP\_assigned}+1$, namely, the number of assigned IP addresses does not exceed the limited (or preset) number of IP addresses in step S414, in step S420, the MN updates the above-described HoA table by increasing $N_{IP\_assigned}$, which is an item of the HoA table, by one. In step S422, the MN establishes a session by using an IP address assigned by the current BS. At this time, in step S424, the BS updates the UE context by increasing $N_{IP\_assigned}$, which is an item within the UE context possessed by the BS, by one.

As described above, when the MN performs a handover process, in order to update information on binding between the MN and the A-MA, the BS needs to be unconditionally assigned with one IP address by a Mobility Agent (MA) of a new PoA. Here, the assigned IP address is an IP address which is not yet associated with any session. The IP address which is not associated with any session is not counted as an IP address assigned to the MN. Specifically, it is not until the MN establishes a new session by using a relevant IP address that the MN determines whether the number of IP addresses that the MN has been assigned up to now exceeds the limited (or preset) number of IP addresses.

According to a result of the determination, the MN needs to determine whether a session is to be established by using an IP address assigned by the relevant BS, or by using an existing assigned IP address. Specifically, if the MN has ever established a session by using the IP address assigned by the relevant BS, it implies that the number of IP addresses that the MN has been assigned with up to now does not exceed the limited (or preset) number of IP addresses, and thus implies that a subsequent session is allowed to be established by using the IP address.

As described above, when the number of IP addresses that the MN has been assigned with up to now exceeds the limited (or preset) number of IP addresses, the MN needs to transmit an IP resolution request message to the BS, and needs to inquire of the BS about which IP address is to be used to establish a session, in step S434. When receiving the IP resolution request message, the BS identifies all IP addresses assigned to the MN by using UE context of the relevant MN. First, the BS identifies the pre-emption vulnerability of sessions associated with each IP address. Because the pre-emptable session is allowed to be disconnected, when there is an IP address pre-emptable by all the associated sessions, the IP address is released, and a new session is established by using a newly-assigned IP address. It goes without saying that all the sessions associated with the released IP address are disconnected. When the number of IP addresses associated with the pre-emptable sessions is plural, a determination needs to be made as to which IP address is to be released. To this end, in an embodiment of the present disclosure, an IP priority contention function is defined.

The IP priority contention function according to an embodiment of the present disclosure can be expressed by Equation (1) below.

$$\text{IP Priority} = \alpha N_{session} + \beta Time_{IP_{assigned}} + \sum^{N_{session}} \left( \gamma Activity_{session} + \delta\left(\frac{1}{Priority_{ARP}}\right) + \varepsilon QCI \right) \quad (1)$$

In Equation 1, α, β, γ, δ and ε values represent weights of the terms, respectively, and can change depending on an operator of the network. An IP priority is calculated by using Equation 1, and an IP address having the lowest priority is released.

Figure 5:
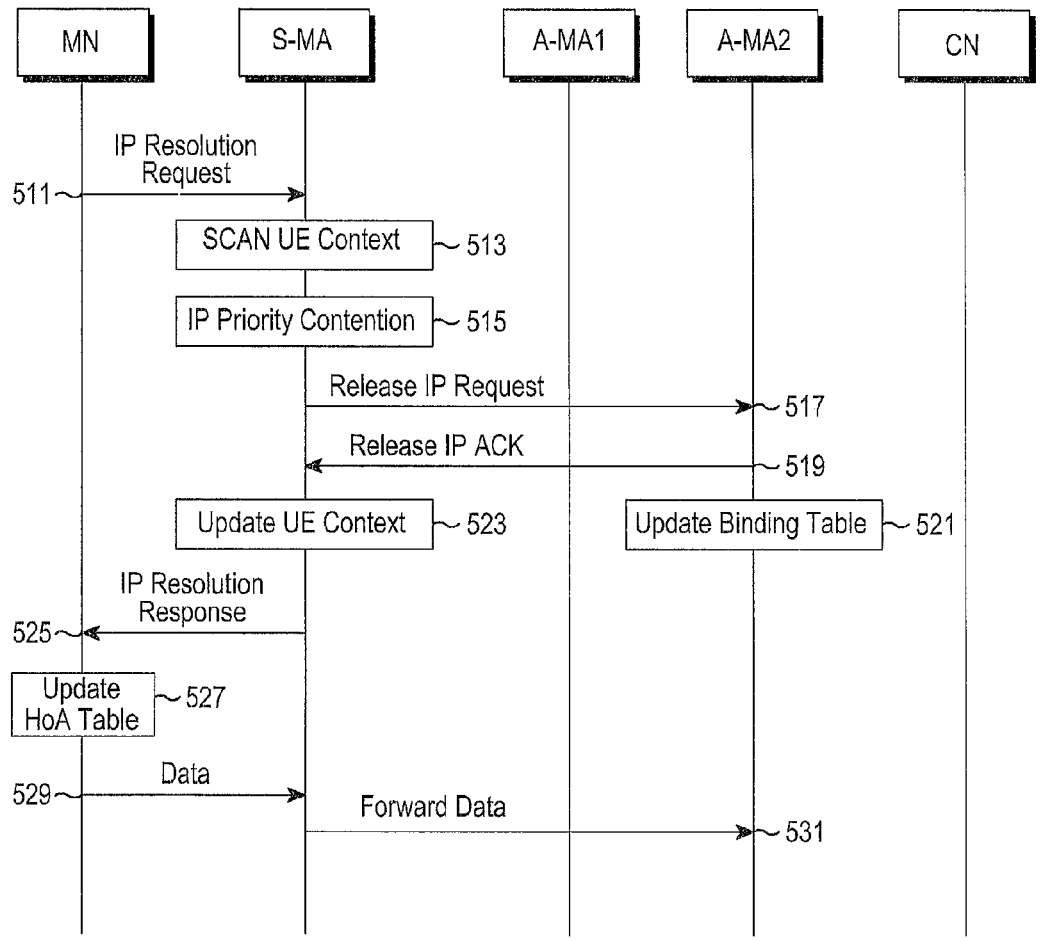
FIG. 5 is a signal flow diagram illustrating a case of returning an IP address, which has been selected through IP priority contention, to a relevant Anchoring-Mobility Agent (A-MA) according to an embodiment of the present disclosure.

FIG. 5 is a signal flow diagram illustrating a case of returning an IP address, which has been selected through IP priority contention, to a relevant Anchoring-Mobility Agent (A-MA) according to an embodiment of the present disclosure.

FIG. 5 illustrates an MN, a Serving-Mobility Agent (S-MA), an Anchoring-Mobility Agent1 (A-MA1), an Anchoring-Mobility Agent2 (A-MA2), and a CN. In an embodiment of the present disclosure illustrated in FIG. 5, when the MN intends to connect a session with the S-MA, the MN returns an IP address, which has been selected through priority contention performed by the S-MA, to the A-MA2.

Specifically, in step 511, the MN transmits an IP resolution request message to the S-MA.

In step 513, the S-MA scans UE context of the MN, according to the IP resolution request message. The S-MA identifies all IP addresses assigned to the MN, by using the scanned UE context.

In step 515, when there are multiple IP addresses which are associated with the pre-emptable sessions among all of the identified IP addresses, the S-MA determines an IP address having the lowest priority by using the above-described IP priority contention function.

In step 517, according to the determination, the S-MA transmits an IP release request message, which requests IP address release, to the A-MA2.

In step 519, the A-MA2 transmits an IP release ACK message to the S-MA, in response to the IP release request message. In step 521, the A-MA2 updates a table including information on binding between the A-MA2 and the MN.

In step 523, the S-MA updates the UE context of the MN. When the update of the UE context has been completed in step 523, in step 525, the S-MA transmits an IP resolution response to the IP resolution request message to the MN.

In step 529, when receiving the IP resolution response from the S-MA, the MN updates a HoA table for managing an IP address that the MN is assigned with.

When the update of the HoA table has been completed, the MN transmits data to the S-MA, and the S-MA forwards the data received from the MN, to the CN.

In an embodiment of the present disclosure illustrated in FIG. 5, a case is described in which the S-MA scans the UE context of the MN and a result of scanning the UE context shows that there are multiple IP addresses associated with the pre-emptable sessions from among all the IP addresses associated with a session of the MN. When there is no IP address pre-emptable by all the sessions, no session can be disconnected. Accordingly, a new session needs to be associated with an existing IP address. In this case, as described above, an IP address, with which the new session is to be associated, needs to be selected from among the existing assigned IP addresses. To this end, in an embodiment of the present disclosure, an IP associating function is defined by Equation (2) below.

$$\text{Associating } IP = \alpha\left(\frac{1}{N_{session}}\right) + \beta TIME_{IP_{assigned}} + \sum^{N_{session}} (\text{Pre-emption } Vulnerability_{ARP}) \quad (2)$$

In Equation 2, α and β values represent weights of the terms, respectively, and can be variously set depending on an operator of the network. The value of the IP associating function is calculated by using Equation 2, and a new session corresponding to the largest value is associated.

Figure 6:
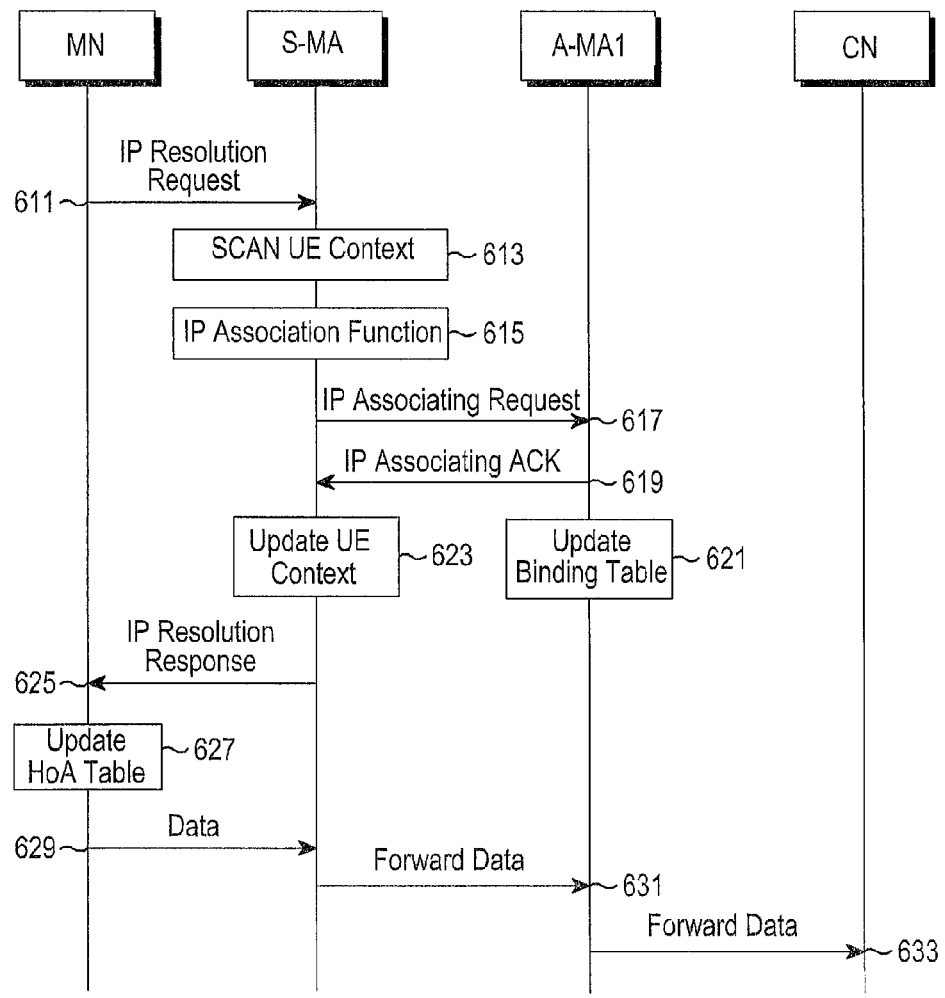
FIG. 6 is a signal flow diagram illustrating a process for associating a new session with an IP address, which has been selected through an IP associating function, according to an embodiment of the present disclosure.

FIG. 6 is a signal flow diagram illustrating a process for associating a new session with an IP address, which has been selected through an IP associating function, according to an embodiment of the present disclosure.

Referring to FIG. 6, in step 611, the MN first transmits an IP resolution request message to the S-MA.

In step 613, the S-MA scans UE context of the MN, according to the IP resolution request message of the MN, and identifies all IP addresses assigned to the MN, by using the scanned UE context.

In step 615, when a result of the identification shows that there is no IP address associated with pre-emptable sessions among all IP addresses associated with a session of the MN, an IP address, with which a session is associated, is selected from among the existing assigned IP addresses by using the IP associating function defined by Equation 2.

In step 617, when an existing assigned IP address associated with the A-MA1 is selected according to the IP associating function, the S-MA transmits an IP associating request, which associates the session with the selected IP address, to the A-MA1.

In step 619, the A-MA1 transmits an IP associating ACK to the IP associating request, to the S-MA.

The A-MA1 updates a table including binding information related to the establishment of a session with the MN in step 621, and simultaneously, the S-MA updates the UE context of the MN in step 623.

In step 625, when the S-MA has completed the update of the UE context of the MN, the S-MA transmits an IP resolution response to the IP resolution request message in step 611, to the MN.

In step 627, when receiving the IP resolution response, the MN updates a HoA table that the MN has.

In step 629, the MN transmits data, which the MN intends to transmit to the CN, to the S-MA according to the updated HoA table. In step 631, the S-MA forwards the received data to the A-MA1 corresponding to the existing assigned IP address. In step 633, the A-MA1 again forwards the data, which has been forwarded by the S-MA, to the final CN.

Figure 7:
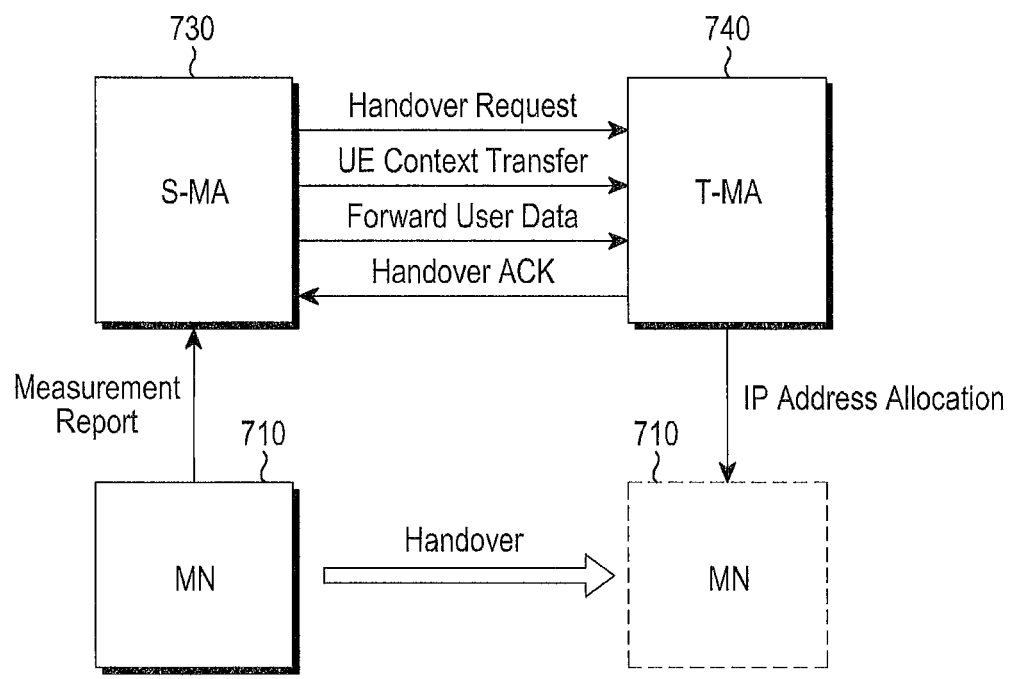
FIG. 7 is a block diagram illustrating a configuration of an overall system according to an embodiment of the present disclosure.
Figure 8:
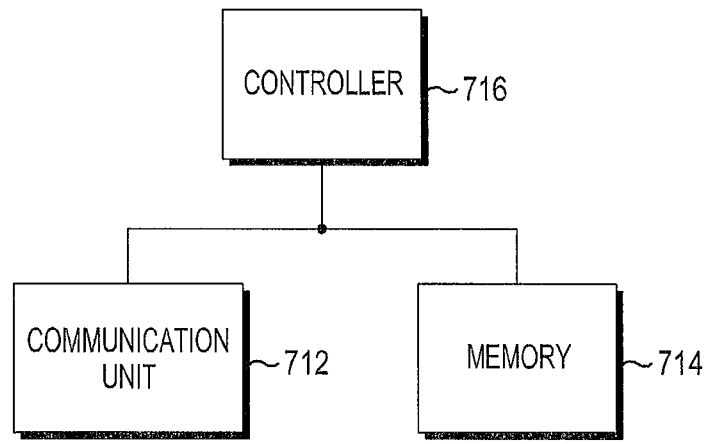
FIG. 8 is a block diagram schematically illustrating an internal configuration of an MN according to an embodiment of the present disclosure.
Figure 9:
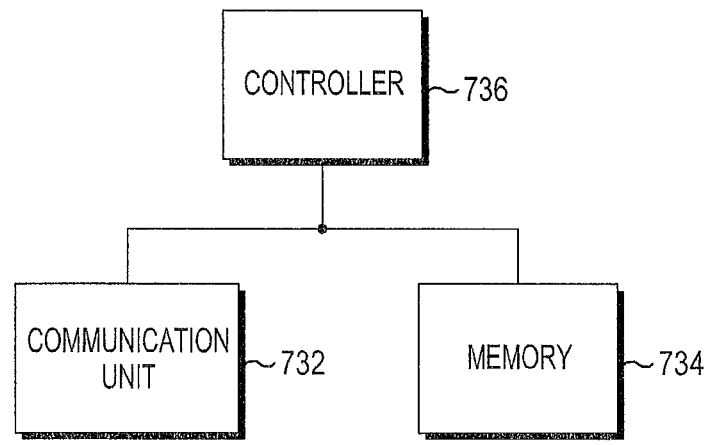
FIG. 9 is a block diagram schematically illustrating an internal configuration of a source-mobility agent according to an embodiment of the present disclosure.

FIG. 7 is a block diagram illustrating a configuration of an overall system according to an embodiment of the present disclosure. FIG. 8 is a block diagram schematically illustrating an internal configuration of an MN according to an embodiment of the present disclosure. FIG. 9 is a block diagram schematically illustrating an internal configuration of an S-MA according to an embodiment of the present disclosure.

Referring to FIG. 7 to FIG. 9, the overall system according to an embodiment of the present disclosure includes the MN, the S-MA, and a T-MA.

The MN includes a communication unit 712, a memory 714, and a controller 716.

When the MN is handed over from the S-MA to the T-MA, the communication unit 712 transmits a measurement report and an IP resolution request, according to the control of the controller 716. The memory 714 stores a HoA table. When the MN is assigned with an IP address by the T-MA, the memory 714 updates the HoA table, according to the control of the controller 716.

The controller 716 controls and manages overall operations of the communication unit 712, the memory 714 and other elements within the MN. When the MN is handed over from the S-MA to the T-MA, the controller 716 compares the total number of IP addresses that the MN has been assigned with up to now, which includes an IP address that the MN is assigned with by the T-MA, with the preset number of IP addresses that the MN is capable of assigning. Also, the controller 716 is configured to associate a session with any one of the IP addresses assigned by the previous MAs or with the IP address assigned by the T-MA, according to a result of the comparison. For example, the controller 716 is configured to associate a session with any one of the IP addresses assigned by the previous MAs, when the total number of IP addresses assigned up to now exceeds the preset number of IP addresses. The controller 716 is configured to associate the session with the IP address assigned by the T-MA, when the total number of IP addresses assigned up to now is less than the preset number of IP addresses. Here, the previous MAs signify the previous S-MAs and T-MAs. Specifically, the previous MAs can include all the S-MAs and T-MAs, which have contributed to handovers of the MN up to now.

The S-MA 730 includes a communication unit 732, a memory 734, and a controller 736. The communication unit 732 receives a measurement report and an IP resolution request from the MN. The controller 736 determines whether handover is to be performed, according to the received measurement report. According to the determination of handover, the controller 736 transmits a handover request message to the T-MA and receives a handover ACK to the handover request message, through the communication unit 732.

Also, according to the received IP resolution request, the controller 736 scans UE context of the MN, and identifies IP addresses associated with pre-emptable sessions among IP addresses assigned by the previous S-MAs. When the controller 736 has identified the IP addresses associated with the pre-emptable sessions, the controller 736 is configured to associate a new IP address to the MN, and associates a session with the assigned new IP address. In contrast, when the controller 736 has identified that there are no IP addresses associated with the pre-emptable sessions, the controller 736 is configured to associate the session with an IP address that the MN has been assigned with by any one of the previous MAs.

As described above, according to an embodiment of the present disclosure, when the MN is assigned IP addresses, the number of which is greater than or equal to the limited (or preset) number of IP addresses that the MN is capable of being assigned with, the MN identifies information on the pre-emption vulnerability of each session associated with an IP address, and releases an IP address which enables a disconnection of a session. When there are multiple IP addresses associated with the pre-emptable sessions, a consideration is given to multiple conditions related to which IP address is to be selected, one IP address is selected, and the relevant IP address is released. Accordingly, it is possible to strengthen the advantage of a property of the shortest data path of the dynamic distributed MN mobility management while providing the user with minimum inconvenience. When any IP address cannot be released, a new session is associated with an IP address which can give the smallest overhead to the MN and the network among the existing IP addresses, so that an IP address can be efficiently assigned.

According to an embodiment of the present disclosure, when the MN is assigned with IP addresses, the number of which is greater than or equal to the limited (or preset) number of IP addresses that the MN is capable of being assigned with, the MN identifies information on the pre-emption vulnerability of each session associated with an IP address, and releases an IP address which enables a disconnection of a session. Particularly, when multiple IP addresses meet the above-described requirements, a consideration is given to multiple conditions related to which IP address is to be selected from among the multiple IP addresses, one IP address is selected, and the relevant IP address is released.

Accordingly, it is possible to strengthen the advantage of a property of the shortest data path of the dynamic distributed MN mobility management while providing the user with minimum inconvenience. When any FP address cannot be released, a new session is associated with an IP address which can give the smallest overhead to the MN and the network among the existing IP addresses, and thereby the method for efficiently assigning an IP address can be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for associating an internet protocol (IP) address with a session by a terminal in a mobile communication network, the method comprising:
   determining whether a new session with a corresponding terminal is a first session associated with an IP address assigned by a base station (BS), if the terminal attempts to connect the new session with the corresponding terminal;
   comparing a total number of IP addresses that the terminal has been assigned with a preset number of IP addresses that the terminal is capable of being assigned with, if the new session is the first session;
   associating the new session with one of the IP addresses assigned by the BS, if the total number of IP addresses is less than the preset number of IP addresses; and
   associating the new session with a IP address selected by the BS, if the total number of IP addresses exceeds the preset number of IP addresses.

2. The method as claimed in claim 1, further comprising:
   updating a table including information on the preset number of IP addresses and information on the total number of IP addresses based on a result of the associating.

3. A method for assigning an internet protocol (IP) address to a terminal by a base station in a mobile communication network, the method comprising:
   receiving an IP resolution request for a new session from the terminal;
   identifying IP addresses associated with pre-emptable sessions among IP addresses assigning to the terminal, by scanning information of the terminal based on the IP resolution request;
   releasing the identified IP addresses and associating the new session with a new IP address by assigning the new IP address to the terminal, if it is identified that there exists the IP address associated with the pre-emptable sessions; and associating the new session with one of the IP addresses assigning to the terminal if it is identified that there exists no IP address associated with the pre-emptable sessions.

4. The method as claimed in claim 3, wherein the IP resolution request is received from the terminal, based on a result of comparing a total number of IP addresses assigning to the terminal, with a preset number of IP addresses that the terminal is capable of being assigned with.

5. The method as claimed in claim 4, wherein the IP resolution request is received from the terminal if the total number of IP addresses exceeds the preset number of IP addresses.

6. The method as claimed in claim 3, wherein the identifying of the IP addresses associated with the pre-emptable sessions comprises identifying an IP address having a lowest priority among multiple IP addresses if there exist the multiple IP addresses associated with the pre-emptable sessions.

7. The method as claimed in claim 6, wherein the IP address having the lowest priority (IP priority) is calculated based on an IP priority resolution function,
wherein the IP priority resolution function is defined by $$IP\ Priority = \alpha N_{session} + \beta Time_{IP_{assigned}} + \sum^{N_{session}} \left( \gamma Activity_{session} + \delta \left( \frac{1}{Priority_{ARP}} \right) + \varepsilon QCI \right),$$

wherein $\alpha$, $\beta$, $\gamma$, $\delta$ and $\varepsilon$ represent weights, $N_{session}$ represents the number of sessions established by using a relevant IP address, $Time_{IP\_assigned}$ represents a time point of assigning the relevant IP address, $Activity_{session}$ represents traffic of packets transmitted per second during a relevant session, QCI represents a quality of service class indication, and $Priority_{ARP}$ represents allocation and retention priority (ARP) of the relevant session.

8. The method as claimed in claim 3, wherein the one of the IP addresses assigning to the terminal is selected based on an IP associating function, if it is identified that there exists no IP address associated with the pre-emptable sessions,
wherein the IP associating function is defined by $$Associating\ IP = \alpha \left( \frac{1}{N_{session}} \right) + \beta TIME_{IP_{assigned}} + \sum^{N_{session}} (\text{Pre-emption}\ Vulnerability_{ARP}),$$

wherein $\alpha$ and $\beta$ represent weights, $N_{session}$ represents a number of sessions established by using a relevant IP address, $Time_{IP\_assigned}$ represents a time point of assigning the relevant IP address, and Pre-emption Vulnerability$_{ARP}$ is obtained by quantifying whether a relevant session is pre-emptable.

9. A terminal associating an internet protocol (IP) address with a session in a mobile communication network, the terminal comprising:
a controller configured to determine whether a new session with a corresponding terminal is a first session associated with an IP address assigned by a base station (BS), if the terminal attempts to connect the new session with the corresponding terminal, compare a total number of IP addresses that the terminal has been assigned with a preset number of IP addresses that the terminal is capable of being assigned with, if the new session is the first session, associate the new session with one of the IP addresses assigned by the BS, if the total number of IP addresses is less than the preset number of IP addresses, and associate the new session with a IP address selected by the BS, if the total number of IP addresses exceeds the preset number of IP addresses; and
a transceiver configured to transmit an IP resolution request to the base station based on a result of the comparison.

10. The terminal as claimed in claim 9,
wherein the controller updates a table including information on the preset number of IP addresses and information on the total number of IP addresses based on a result of the associating.

11. The terminal as claimed in claim 10, wherein the table further comprises information on the number of sessions established based on a relevant IP address, information on a time point of assigning the relevant IP address, traffic of packets transmitted per second during a relevant session, information on allocation and retention priority (ARP) of the relevant session, and information indicating whether there is an IP address pre-emptable by a relevant session.

12. A base station that assigns an internet protocol (IP) address to a terminal in a mobile communication network, the MA comprising:
a transceiver configured to receive an IP resolution request for a new session from the terminal; and
a controller configured to:
identify IP addresses associated with pre-emptable sessions among IP addresses assigning to the terminal by scanning information of the terminal based on the IP resolution request;
release the identified IP addresses and associate the new session with a new IP by assigning the new IP address to the terminal, if it is identified that there exists the IP address associated with the pre-emptable sessions; and
associate the new session with one of the IP addresses assigning to the terminal if it is identified that there exists no IP address associated with the pre-emptable sessions.

13. The base station as claimed in claim 12, wherein the terminal is configured to receive the IP resolution request from the terminal, based on a result of comparing a total number of IP addresses assigning to the terminal, with a preset number of IP addresses that the terminal is capable of being assigned with.

14. The base station as claimed in claim 13, wherein the transceiver is configured to receive the IP resolution request from the terminal if the total number of IP addresses exceeds the preset number of IP addresses.

15. The base station as claimed in claim 12, wherein the controller is configured to identify an IP address having a lowest priority among multiple IP addresses if there exist the multiple IP addresses associated with the pre-emptable sessions.

16. The base station as claimed in claim 15, wherein the controller is configured to determine the IP address having the lowest priority (IP priority) based on an IP priority resolution function, wherein the IP priority resolution function is defined by $$IP\ Priority = \alpha N_{session} + \beta Time_{IP_{assigned}} + \sum^{N_{session}} \left(\gamma Activity_{session} + \delta\left(\frac{1}{Priority_{ARP}}\right) + \varepsilon QCI\right),$$

wherein $\alpha$, $\beta$, $\gamma$, $\delta$ and $\epsilon$ represent weights, $N_{session}$ represents the number of sessions established by using a relevant IP address, $Time_{IP\_assigned}$ represents a time point of assigning the relevant IP address, $Activity_{session}$ represents traffic of packets transmitted per second during a relevant session, QCI represents a quality of service class indication, and $Priority_{ARP}$ represents allocation and retention priority (ARP) of the relevant session.

17. The base station as claimed in claim 12, wherein the controller is configured to select the one of the IP addresses assigning to the terminal based on an IP associating function, if it is identified that there exists no IP address associated with the pre-emptable sessions, wherein the IP associating function is defined by $$Associating\ IP = \alpha\left(\frac{1}{N_{session}}\right) + \beta TIME_{IP_{assigned}} + \sum^{N_{session}} (Pre\text{-}emption\ Vulnerability_{ARP}),$$

wherein $\alpha$ and $\beta$ represent weights, $N_{session}$ represents the number of sessions established by using a relevant IP address, $T_{IP\_assigned}$ represents a time point of assigning the relevant IP address, and Pre-emption Vulnerability$_{ARP}$ is obtained by quantifying whether a relevant session is pre-emptable.

* * * * *